(12) United States Patent
Mitchell et al.

(10) Patent No.: US 8,548,248 B2
(45) Date of Patent: Oct. 1, 2013

(54) CORRELATED LAND CHANGE SYSTEM AND METHOD

(75) Inventors: Roger A. Mitchell, Chevy Chase, MD (US); Michael V. Finn, Potomac, MD (US); Jon D. Dykstra, Potomac, MD (US)

(73) Assignee: MDA Information Systems, Inc., Gaithersburg, MD (US)

( * ) Notice: Subject to any disclaimer, the term of this patent is extended or adjusted under 35 U.S.C. 154(b) by 202 days.

(21) Appl. No.: 13/096,174

(22) Filed: Apr. 28, 2011

(65) Prior Publication Data

US 2012/0224772 A1    Sep. 6, 2012

Related U.S. Application Data

(60) Provisional application No. 61/448,094, filed on Mar. 1, 2011.

(51) Int. Cl.
*G06K 9/46* (2006.01)
*G06K 9/00* (2006.01)

(52) U.S. Cl.
USPC .......................................... 382/190; 382/100

(58) Field of Classification Search
None
See application file for complete search history.

(56) References Cited

U.S. PATENT DOCUMENTS

RE38,410 E * 1/2004 Hersch et al. ................. 709/203
2010/0100835 A1* 4/2010 Klaric et al. .................. 715/765

* cited by examiner

*Primary Examiner* — David Zarka
*Assistant Examiner* — Ryan P Potts
(74) *Attorney, Agent, or Firm* — McNeely, Hare & War LLP; Kevin J. McNeely

(57) ABSTRACT

A system and method of mapping a persistent feature change of image data at a geographic location includes selecting a plurality of satellite images from a geographic location on different dates, producing a plurality of two-date satellite change images from pairs of the satellite images, comparing the plurality of satellite change images, and detecting a persistent feature change of image data in the compared satellite change images.
The system may be implemented by selecting a plurality of satellite images from a database from different dates. A change detection module measures a change between pairs of the satellite images to produce a plurality of two-date satellite change images. A change confirmation module compares the two-date satellite change images and to confirm a persistent feature change.

15 Claims, 8 Drawing Sheets

FIG. 5a  Aerial 2002

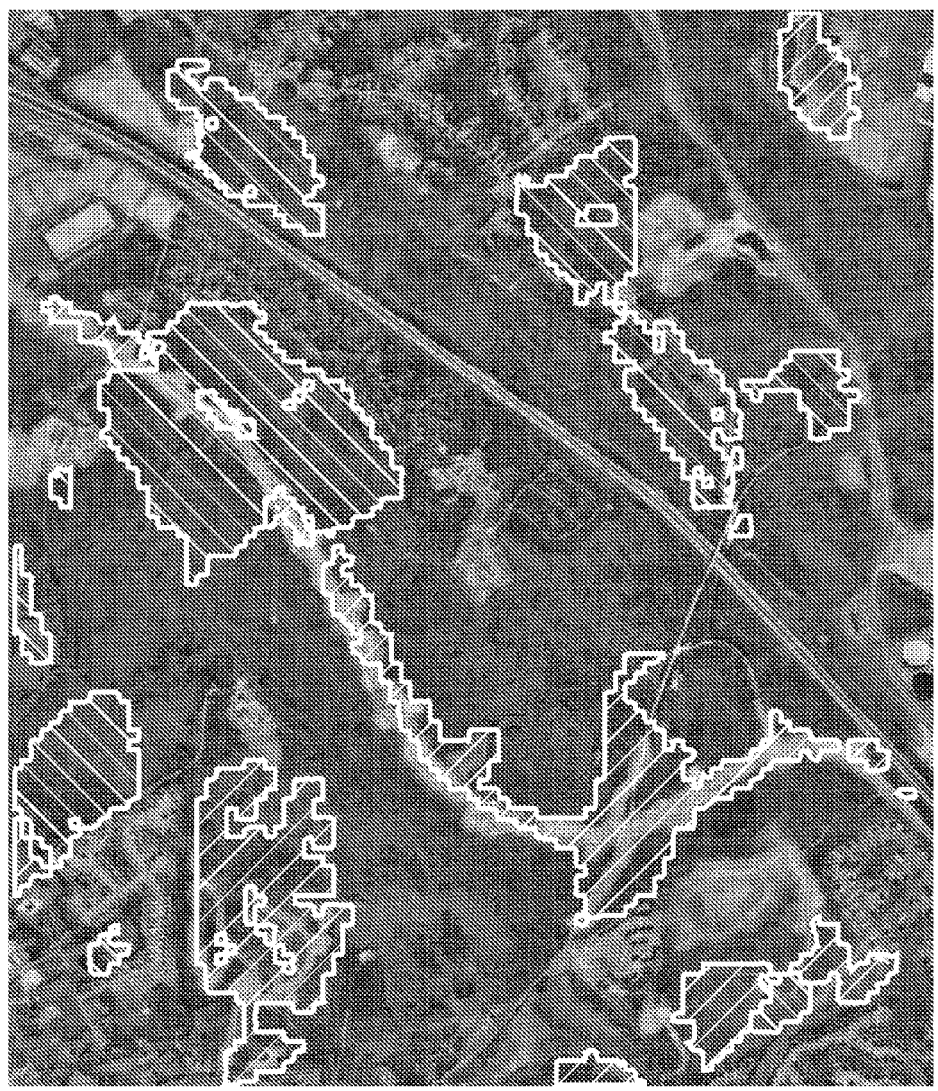
Fig. 5b  Aerial 2002 w/ CLC Change

Aerial 2008 w/ CLC Change

CORRELATED LAND CHANGE SYSTEM AND METHOD

CROSS-REFERENCE TO RELATED APPLICATIONS

This utility patent application claims priority to U.S. Provisional Patent Application Ser. No. 61/448,094 filed on Mar. 1, 2011, which is incorporated by reference herein.

FIELD OF THE INVENTION

The field of the invention includes image processing, and more particularly comparison of satellite images to determine surface changes over time.

BACKGROUND

The land cover at various geographic locations is important for government and commercial uses and a vast array of satellite image products are now available for analysis. An area of increasing interest and concern is how to use satellite imagery for the assessment of local and global environmental changes. The extension of satellite remote sensing technology into these areas benefits society by providing a better understanding of the causes and consequences of pollution, global environmental change, land use change, natural disasters, etc. Thus, satellite imagery has increasingly been used as a data source to identify changes in geographic and environmental features.

Various systems have been developed to detect land cover changes. For example, U.S. Pat. No. 5,719,949 provides an information processing system that uses satellite image data in order to accurately identify changes in the studied areas. The system relies upon a vectorized database which has been classified according to land cover features. Change is defined by a Z-statistic. The Z-statistic is calculated in a two-pass cross-correlation technique when pixel brightnesses are compared to a mean brightness for the typical land cover class and to a standard deviation for that class. The normalized difference values are accumulated across different bands, are scaled and then compared to a threshold which defines high, medium and low change values. A map is produced illustrating areas of significant change.

Changes in land cover may be considered transient or persistent. For example, man-made or anthropomorphic features such as the new building and road construction or other soil disturbance tend to be persistent changes. However, many changes that are identified turn out to be transient or seasonal in nature. For example, crops may be rotated, leaves may be on or off of deciduous trees and snow, rain or other weather conditions may appear as changes in land cover. Thus, the identification of changes in land cover by various change detection systems may not distinguish between transient or cyclical changes in comparison to what may be persistent changes.

SUMMARY

The correlated land change system uses a series of satellite images of a geographic location that are taken on different dates to identify permanent or persistent changes in land cover. Persistent changes that can be identified include changes in wetlands, urban expansion, agricultural encroachment, land degradation, and wind and water erosion. Transient changes can be detected and discarded as not contributing to a persistent change in land cover.

In one general aspect, a method of mapping a persistent feature change of image data at a geographic location includes selecting a plurality of satellite images from a geographic location on different dates, producing a plurality of two-date satellite change images from pairs of the satellite images, comparing the plurality of satellite change images, and detecting a persistent feature change of image data in the compared satellite change images.

Embodiments may include one or more of the following features. For example, the persistent feature change of the image data may be displayed on a map of the geographic location. The changes that are detected may be in individual pixels at a given coordinate between a pair of the satellite images. Time or date sequential image stacks may be used and the comparisons may be performed in a date sequential order.

As another feature, discrete date periods may be selected for the comparison of date sequential pairs of the satellite change images. The persistent feature changes for the discrete date period may then be displayed.

As still another feature, confirmation of the persistent feature change of the image data may include multiple confirmations of the persistent change by confirming, no change between more than one satellite image from a first date period, no change between more than one satellite image from a second date period, and a consistent change between the more than one satellite image from the first date period and the more than one satellite image from the second date period.

More specifically, the persistent feature change of the image data may be a triple confirmation. In triple confirmation, there should be no change between three satellite images from a first date period, no change between three satellite images from a second date period, and a consistent change between three satellite images from the first date period to the second date period.

As a further feature, three satellite images from a first date period and three satellite images from a second date period. The two-date satellite change images may be produced by a comparison of each of the three satellite images from the first date period to all of the other satellite images from the first date period, each of the three satellite images from the second date period to all of the other satellite images from the second date period, and each of the three satellite images from the first date period to each of the three satellite images from the second date period.

Detection of the persistent feature change of image data in the compared satellite change images comprises may include identifying a first identical feature profile for each of the three satellite images from the first date period, identifying a second identical feature profile for each of the three satellite images from the second date period, and detecting a consistent change from the first identical feature profile to the second identical feature between each of the three satellite images from the first date period to the second date period.

As an example, the three satellite images from the first date period are defined as d1, d2 and d3 and three satellite images from the second date period are defined as d4, d5 and d6. The two-date satellite change images from the first date period include comparison of d1-d2, d1-d3 and d2-d3. The two-date satellite change images from the second date period include comparison of d4-d5, d4-d6 and d5-d6. And, the two-date satellite change images from the first date period to the second date period include comparison of d1-d4, d1-d5, d1-d6, d2-d4, d2-d5, d2-d6, d3-d4, d3-d5 and d3-d6.

In another general aspect, an image processing system that detects persistent changes in image features includes a database with a plurality of satellite images from a geographic location on different dates, a change detection module that measures a change, on a pixel-by-pixel basis, between all pairs of the satellite images to produce a plurality of two-date satellite change images, and a change confirmation module to compare each of the plurality of two-date satellite change images and thereby confirm a persistent feature change of image data in the compared satellite change images.

The system may include one or more of the above or following features. For example, the system may include a memory to store the two-date satellite change images. The change confirmation module may apply a three date confidence level test such that confirmation of the persistent feature change requires that a pixel at a given coordinate has remained in a first state for at least three observations, has changed to a second state for at least three observations, and shows that each of the three observations from the first state shows a change from the three observations of the second state.

Other features will be apparent from the description, the drawings, and the claims.

BRIEF DESCRIPTION OF THE DRAWINGS

The drawings are meant to illustrate the principles of the invention and are not therefore to be considered to limit its scope. The above-mentioned features of the present disclosure will become more apparent with reference to the following description taken in conjunction with the accompanying drawings wherein like reference numerals refer to like elements.

FIGS. 5a-5d illustrate satellite images of a geographic location on different dates.

DETAILED DESCRIPTION

Correlated land change (CLC) is geospatial data processing system that ingests a multi-temporal stack of remotely sensed digital images of the earth's surface and produces vector and raster GIS-compatible digital products that map and date areas of change.

Figure 1:
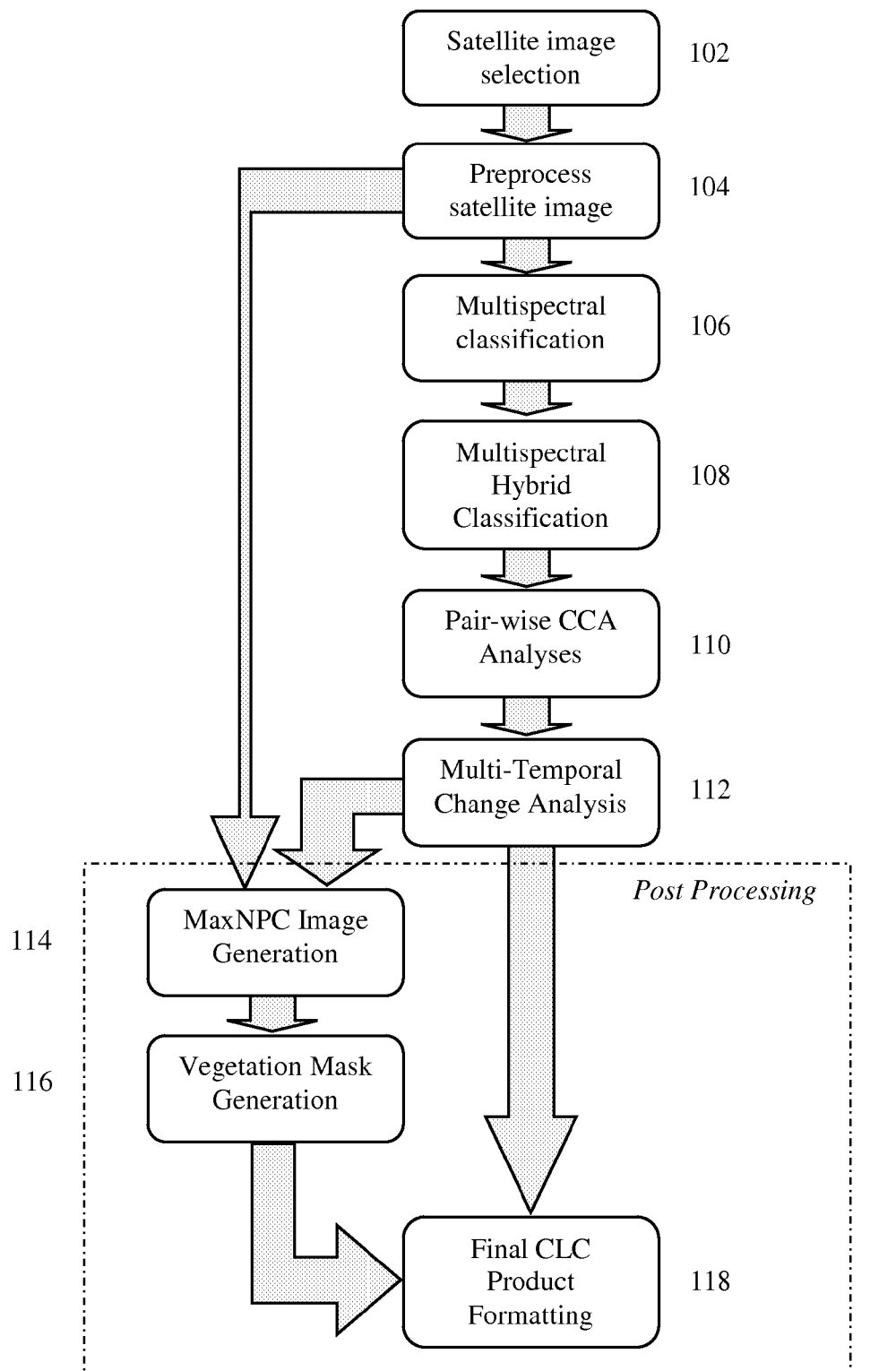
FIG. 1 is a flowchart of a method of mapping a persistent feature change of image data.

Referring to FIG. 1, a method of mapping a persistent feature change of image data at a geographic location includes selecting a plurality of satellite images from a geographic location on different dates (operation 102). For example, the satellite image data may be Landsat data selected from USGS EROS Data Center archive using the USGS provided GloVis web application. The selected image data can be downloaded using an ftp-based application.

In operation 104, the image data is preprocessed to calculate top of atmosphere (TOA) using published algorithms. Spectral artifacts are then cleaned from the Landsat data. In operation 106, spectral data is classified into common spectral groups. In operation 108, an iterative classification technique refines the multispectral classification results.

In operation 110, a plurality of two-date satellite change images are produced from pairs of the refined image data that are derived from the satellite images. The two-date satellite change images include each pair-wise permutation across the temporal stack of Landsat images using a sliding 12-date window.

In operation 112, a multi-temporal change analysis is performed in which each change image is analyzed to detect and date "triply confirmed" change events. For example, a triple confirmed change event includes a comparison of every one of the three satellite images from a first date period to every one of three satellite images from the second date period, every one of the three satellite images from the first date period to the other satellite images from the first date period, and every one of the three satellite images from the second date period to the other satellite images from the second date period.

A persistent feature change is confirmed by identifying a first identical feature profile for each of the three satellite images from the first date period, a second identical feature profile for each of the three satellite images from the second date period, and a change from the first identical feature profile to the second identical feature between each of the three satellite images from the first date period to the second date period.

In operation 114, the normalized difference vegetation index (NDVI) is calculated for each image. For each detected change pixel, the maximum NDVI value observed after the determined date of change is recorded as the pixel value defined as MaxNPC (Maximum NDVI Post Change) image. In operation 116, a manual threshold is performed to create a vegetation mask based on the MaxNPC image. The final image results are formatted in operation 118, by applying the vegetation mask and final raster and vector abstractions are generated from the image data.

Figure 2:
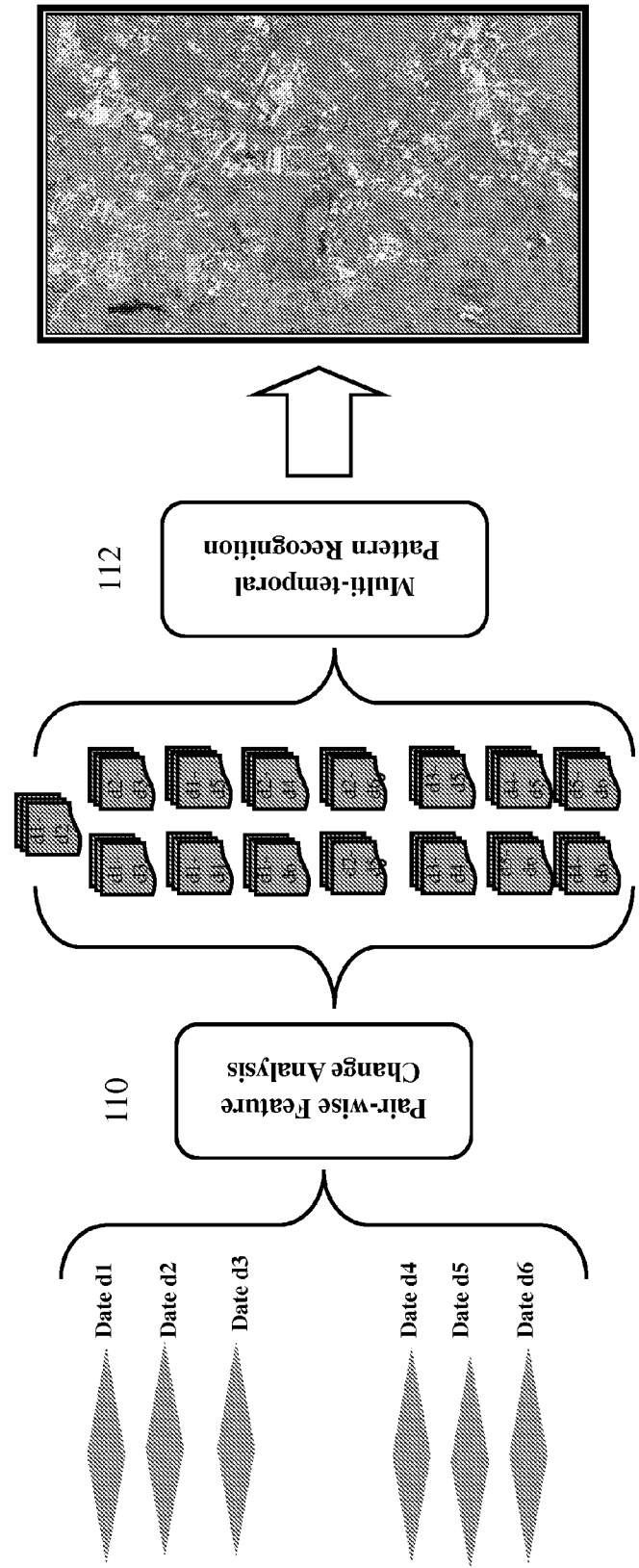
FIG. 2 is a diagram showing more detail for operations 110 and 112.

Referring to FIG. 2, the production of two-date satellite change images 110 and the satellite image multi-temporal change analysis 112 are explained in more detail. In one of the preferred embodiments, Cross-correlation Analysis (CCA) may be used for production of the two-date satellite change images. Other change detection approaches may also be used, such as, for example, traditional post-classification cross-tabulation, neural networks, knowledge-based expert systems, and image segmentation and object-oriented classification.

Cross-correlation Analysis is a change detection method that measures the differences between an existing land cover image and a recent single date multispectral image. The CCA method uses the class boundaries from the base land cover image to derive an expected class average spectral response. This information is used to derive a Z-statistic for each pixel falling within a given land cover type. The Z-statistic describes how close a pixel's response is to the expected spectral response of its corresponding class value in the land cover image. Pixels that have undergone change between the T1 land cover image and the T2 multispectral image will produce high Z-statistic values while pixels that have not changed will produce low Z-statistic values.

In the example shown in FIG. 2, operation 110 produces 15 two-date satellite change images for 6 satellite images which include satellite images from a first date period (d1, d2, d3) and satellite images from a second date period (d4, d5, d6). The two-date satellite change images the two-date satellite change images from the first date period include comparison of d1-d2, d1-d3 and d2-d3. The two-date satellite change images from the second date period include comparison of d4-d5, d4-d6 and d5-d6. The two-date satellite change images that compare the first date period to the second date period include d1-d4, d1-d5, d1-d6, d2-d4, d2-d5, d2-d6, d3-d4, d3-d5 and d3-d6.

Figure 3:
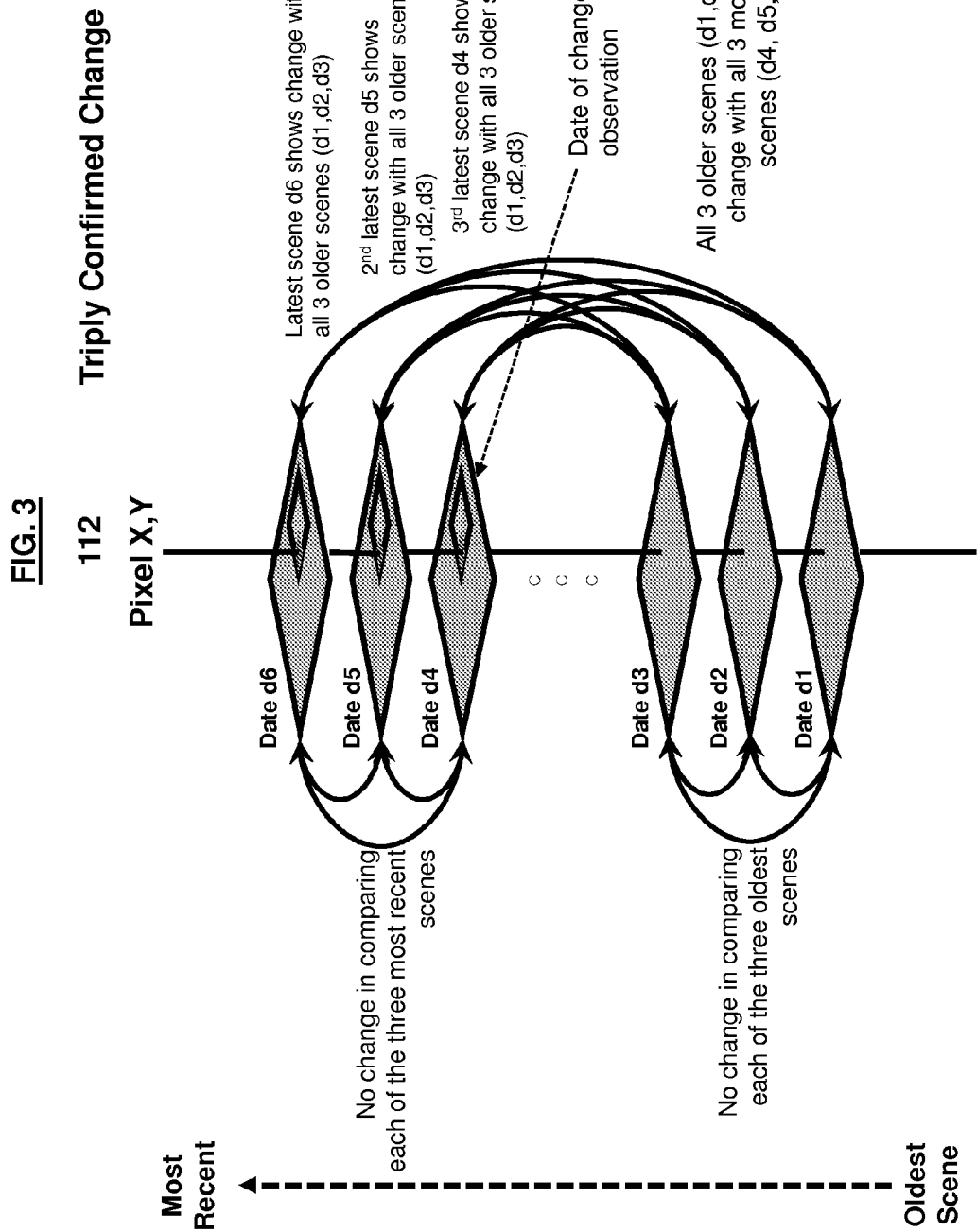
FIG. 3 is a diagram showing more detail for operation 112.

Referring to FIG. 3, the result of operation 112 is referred to as a "triply confirmed change." In a triply confirmed change, there are three comparisons that must show no change in comparing each of the three oldest scenes (images). There must also be no change in each of the three most recent scenes. Finally, the three latest scene changes must show consistent change with all three of the older scenes. The date of change is set as the first observation of the image change (d4).

Figure 4:
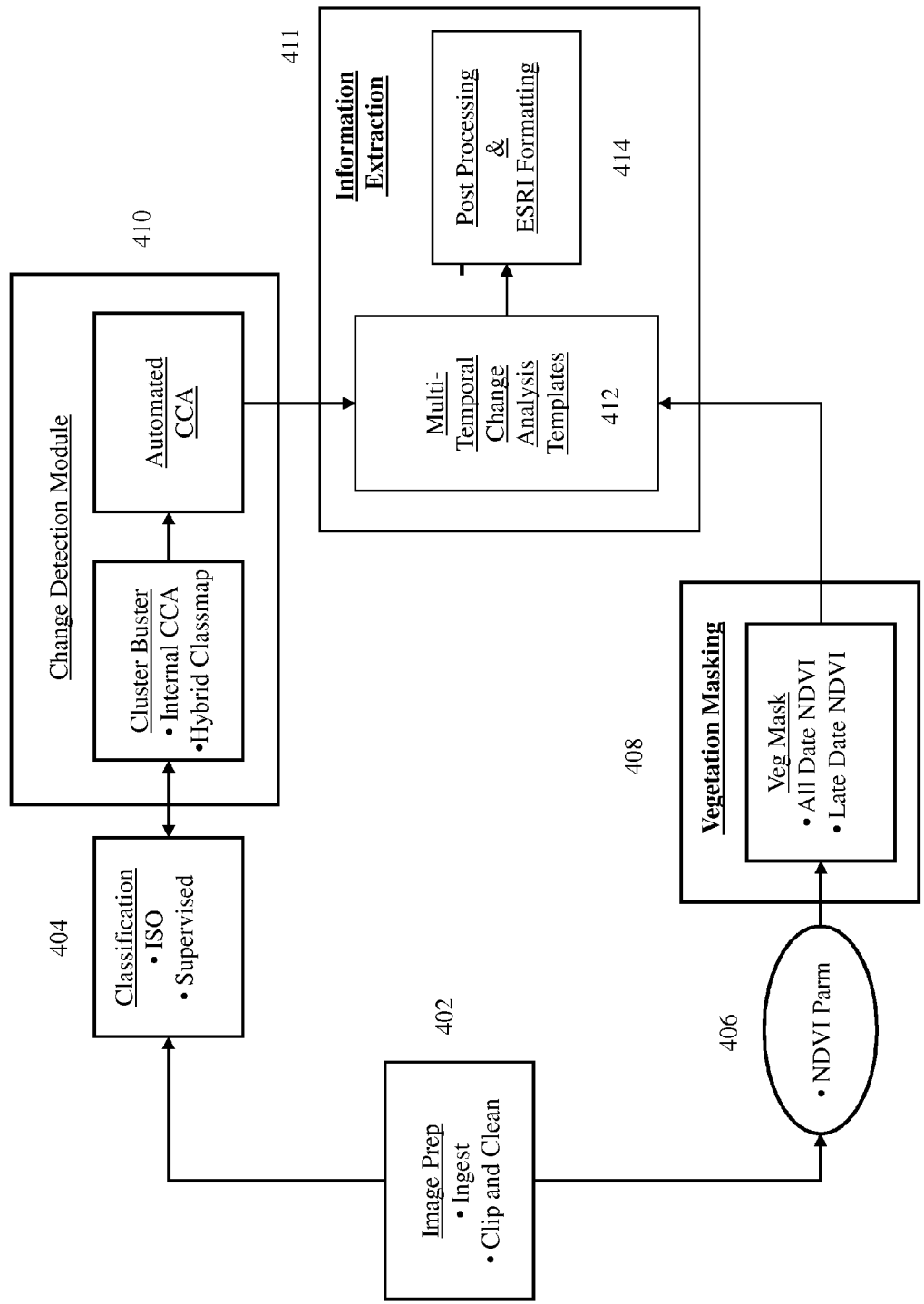
FIG. 4. is a block diagram for a system of mapping a persistent feature change of image data.

Referring to FIG. 4, the system of mapping a persistent feature change of image data can be implemented in modules. The image prep module 401 is the entry point into the CLC processing system where the multispectral satellite image data is ingested and radiometrically adjusted to "Top of Atmosphere" (TOA) reflectance values using US Government (USGS/EDC) published algorithms. Another algorithm, such as an Applicant designed algorithm is then performed to clean spectral artifacts from the satellite image data.

In the classification module 402 of FIG. 4, the cleaned TOA data is spectrally clustered using an ISO-Classification process. The resulting spectral clusters are then processed using published Supervised Classification techniques to create an interim classification image.

The interim classification image is passed to a cluster buster module 403 which performs a process called "Hybrid Cluster Busting". This process calculates an "Internal CCA" using Applicant's CCA algorithm. The Internal CCA is used to measure subtle separations within the differing classes of the interim classification. These areas of subtle difference are isolated and reprocessed using an ISO-Classification algorithm. The classification results of this second process are combined with those of the interim classification to create the final "Hybrid Classmap".

The Hybrid Classmaps are then used in the CCA module 404 to create the collection of CCA results that will be processed against the multi-temporal templates in multi-temporal change analysis module 405. For a representative stack of 25 satellite image dates, the resulting number of unique CCA scenes can reach above 450. This vast data volume is supported by collection of multi-core processors working within a local Cloud processing environment.

The heart of the CLC process is performed in module 405. Here the hundreds of individual CCA images created by module 404 are analyzed against a collection of templates that are designed to detect "Triply Confirmed Change" as defined above in Operation 112 of FIG. 1.

Max NPC module 406 uses the TOA satellite image data and the Change Analysis results from module 405 to create a "Max_NPC" (Maximum NDVI Post-Change) image. The Max_NPC is created from individual normalized difference vegetation indices (NDVI) images calculated from each input satellite image using commonly known algorithms. A specially designed MDA process then uses the Change Analysis results of module 405 to create a single output image which carries, for each change pixel, the maximum NDVI value across all of the input satellite images.

Post processing routines are performed by a post processing module 407, as described in Operations 114 through 118 of FIG. 1. The module 407 then filters, aggregates and formats the final CLC product deliverables.

The modules described in FIG. 4 may be part of a computer system, however, the modules are not required to be on a single computer. The modules may each be located on the computer or may be located on separate computers connected to the computer over a network, such as the Internet.

A memory or storage device with a fixed disk may be used where an operating system, application programs, and/or data may be stored. For the purposes of this disclosure a module is a software, hardware, or firmware (or combinations thereof) system, process or functionality, or component thereof, that performs or facilitates the processes, features, and/or functions described herein (with or without human interaction or augmentation).

A module can include sub-modules. Software components of a module may be stored on a computer readable medium. Modules may be integral to one or more servers, or be loaded and executed by one or more servers. One or more modules may be grouped into an engine or an application and implemented by at least one processor of a computing device.

The technology to implement the claimed invention should be interpreted as statutory subject matter. For example, the computer readable medium should be defined as a "non-transitory" computer readable medium to the extent required to meet patentable subject matter requirements.

Figure 5C:

FIGS. 5a-5c illustrate satellite images of a geographic location on different dates. The area was analyzed to identify persistent changes every year between 2002 and 2008. FIG. 5a illustrates the appearance of the ground in 2002. FIG. 5b shows areas of change from 2002 through two dates of change in later years indicated by cross-hatch marks. Persistent changes between 2002 and 2005 are indicated by hash marks running from northwest to southeast. Persistent changes identified between 2005 and 2007 are shown by hash marks running in a direction of northeast to southwest.

Figure 5D:

FIG. 5c. shows the ground in 2008. FIG. 5d shows the same a final change measurement from the period of 2002 to 2008. The hash marks are identical in FIGS. 5b and 5d which confirms that these areas have indeed shown persistent change and that there were no additional changes.

Some examples of the implementation of the technology have been described. Nevertheless, it will be understood that various modifications may be made. For example, suitable results may be achieved if the steps of described techniques are performed in a different order and/or if components in a described system, architecture, device, or circuit are combined in a different manner and/or replaced or supplemented by other components. Accordingly, other implementations are within the scope of the following claims.

The invention claimed is:

1. A computer implemented method of mapping a persistent feature change of image data at a geographic location, the method comprising:
   selecting a plurality of satellite images from a geographic location on different dates;
   producing, by a processor, a plurality of two-date satellite change images from pairs of the satellite images;
   comparing, with the processor, the plurality of satellite change images; and
   detecting, with the processor, a persistent feature change of image data in the compared satellite change images, wherein detecting the persistent feature change of the image data consists of a triple confirmation of the persistent change by confirming
      no change between three satellite images from a first date period,
      no change between three satellite images from a second date period, and
      a consistent change between three satellite images from the first date period to the second date period.

2. The method of claim 1, further comprising:
   displaying persistent feature change of image data on a computer generated map of the geographic location.

3. The method of claim 1, wherein:
  selecting the plurality of satellite images from the geographic location on different dates comprises selecting a date-sequential image stack from the plurality of satellite images of the geographic location; and
  comparing the satellite change images comprises comparing satellite change images in a date sequential order.

4. The method of claim 1, wherein comparing the plurality of satellite change images comprises comparing date sequential pairs of the satellite change images.

5. The method of claim 4, further comprising:
  selecting a discrete date period for the comparison of date sequential pairs of the satellite change images; and
  displaying the persistent feature change of image data on a map of the geographic location for the discrete date period.

6. The method of claim 1, wherein:
  selecting comprises selecting three satellite images from the first date period and three satellite images from the second date period; and
  producing comprises producing the two-date satellite change images by a comparison of
    each of the three satellite images from the first date period to all of the other satellite images from the first date period,
    each of the three satellite images from the second date period to all of the other satellite images from the second date period, and
    each of the three satellite images from the first date period to each of the three satellite images from the second date period.

7. The method of claim 6, wherein detecting the persistent feature change of image data in the compared satellite change images comprises:
  identifying a first identical feature profile for each of the three satellite images from the first date period;
  identifying a second identical feature profile for each of the three satellite images from the second date period; and
  detecting a consistent change from the first identical feature profile to the second identical feature between each of the three satellite images from the first date period to the second date period.

8. The method of claim 6, wherein:
  the three satellite images from the first date period are defined as d1, d2 and d3;
  the three satellite images from the second date period are defined as d4, d5 and d6;
  the two-date satellite change images from the first date period include comparison of d1-d2, d1-d3 and d2-d3;
  the two-date satellite change images from the second date period include comparison of d4-d5, d4-d6 and d5-d6; and
  the two-date satellite change images from the first date period to the second date period include comparison of d1-d4, d1-d5, d1-d6, d2-d4, d2-d5, d2-d6, d3-d4, d3-d5 and d3-d6.

9. The method of claim 1, wherein producing the plurality of satellite change images includes:
  detecting a change in a pixel at a given coordinate between a pair of the satellite images.

10. The method of claim 1, wherein:
  comparing the plurality of satellite change images includes comparing by a second processor that is configured as a change confirmation module; and
  storing the detected persistent feature changes in a memory.

11. An image processing system to detect persistent changes in image features comprising:
  a database that includes a plurality of satellite images from a geographic location on different dates;
  a change detection module that measures a change, on a pixel-by-pixel basis, between all pairs of the satellite images to produce a plurality of two-date satellite change images; and
  a change confirmation module to compare each of the plurality of two-date satellite change images and thereby confirm a persistent feature change of image data in the compared satellite change images, wherein the persistent feature change consists of a triple confirmation of the persistent change by confirming
    no change between three satellite images from a first date period,
    no change between three satellite images from a second date period, and
    a consistent change between three satellite images from the first date period to the second date period.

12. The image processing system of claim 11, further comprising:
  a memory to store the two-date satellite change images.

13. The image processing system of claim 11, wherein the change confirmation module applies a three date confidence level test such that confirmation of the persistent feature change requires that a pixel at a given coordinate has remained in a first state for at least three observations, has changed to a second state for at least three observations, and shows that each of the three observations from the first state shows a change from the three observations of the second state.

14. A non-transitory computer-readable recording medium containing computer-readable codes providing commands for a computer to execute a process including:
  selecting a plurality of satellite images from a geographic location on different dates;
  producing a plurality of two-date satellite change images from pairs of the satellite images;
  comparing the plurality of satellite change images; and
  detecting a persistent feature change of image data in the compared satellite change images between a first date period and a second date period by a confirmation process consisting of
    no change between three satellite images from the first date period;
    no change between three satellite images from the second date period; and
    a consistent change between the three satellite images from the first date period to the three or more satellite images of the second date period.

15. The non-transitory computer-readable recording medium of claim 14, wherein
  selecting a plurality of satellite images from a geographic location on different dates includes selecting three satellite images from the first date period and three satellite images from the second date period.

* * * * *